No. 643,053. Patented Feb. 6, 1900.
M. E. HALFMANN.
FINGER RING AND ATTACHMENT THEREFOR.
(Application filed Nov. 6, 1899.)
(No Model.)
Fig. 2.
Fig. 1.
Fig. 5.
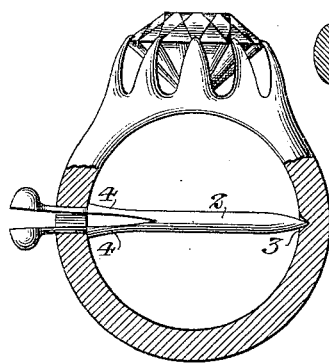
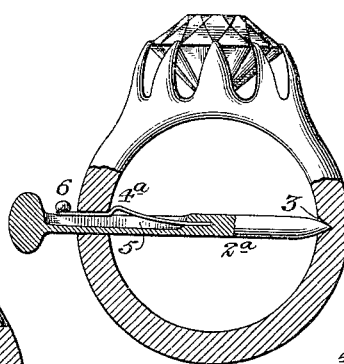
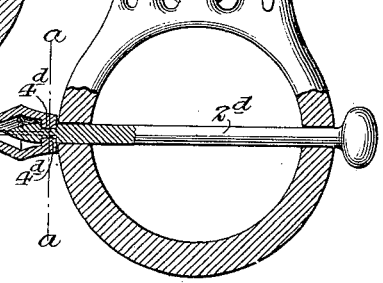
Fig. 7.
Fig. 3.
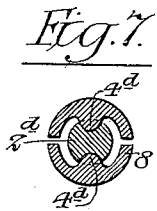
Fig. 4.
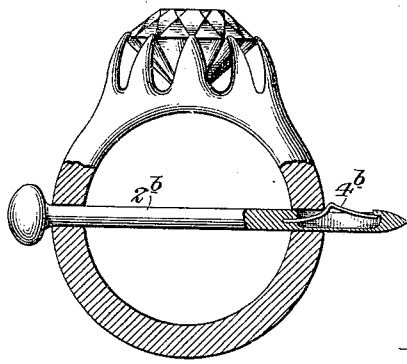
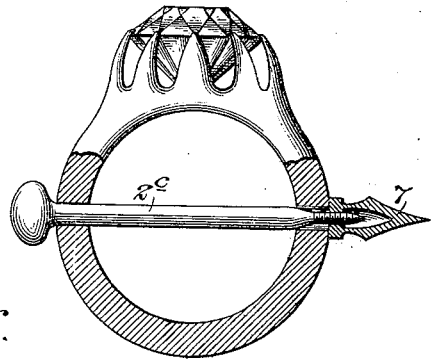
Fig. 6.
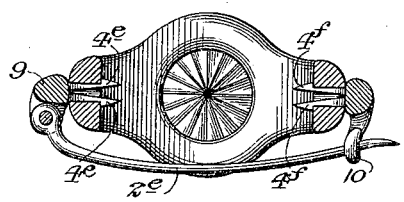
Witnesses:-
Louis M. Whitehead.
F. E. Bechtold
Inventor:-
Mary E. Halfmann.
by her Attorneys.
THE NORRIS PETERS CO., PHOTO-LITHO., WASHINGTON, D. C.

UNITED STATES PATENT OFFICE.

MARY E. HALFMANN, OF PHILADELPHIA, PENNSYLVANIA.

FINGER-RING AND ATTACHMENT THEREFOR.

SPECIFICATION forming part of Letters Patent No. 643,053, dated February 6, 1900.

Application filed November 6, 1899. Serial No. 736,007. (No model.)

*To all whom it may concern:*

Be it known that I, MARY E. HALFMANN, a citizen of the United States, residing in Philadelphia, Pennsylvania, have invented certain Improvements in Finger-Rings and Attachments Therefor, of which the following is a specification.

The object of my invention is to so construct a finger-ring that the same may be used when so desired as a pin or brooch, an object which I attain in the manner hereinafter set forth, reference being had to the accompanying drawings, in which—

Figure 1 is a view, on an enlarged scale, illustrating a finger-ring made in accordance with my invention and also a retaining and securing pin used in connection therewith. Figs. 2, 3, 4, 5, and 6 are similar views illustrating other embodiments of my invention; and Fig. 7 is an enlarged transverse section on the line *a a*, Fig. 5.

The value of a handsome finger-ring would be very materially enhanced if it could be used as a pin or brooch without marring it or otherwise interfering with its ordinary use, and my invention is intended to enable a finger-ring to be thus used.

The invention consists in forming in the ring one or more openings intended for the reception of a pin, whereby the ring may be fastened to a collar, dress, tie, or other article of apparel, suitable means being provided to prevent the accidental removal of the pin when the ring is being thus used.

The ring shown in Fig. 1 has in one side an opening for the reception of the securing or retaining pin 2, the point of the pin resting in a socket 3 in the opposite side of the ring and the accidental withdrawal of the pin after its insertion being prevented by means of spring-catches 4, formed by splitting and spreading the head end of the pin, so that said catches will, when the pin is inserted, engage with the inner face of the ring and prevent the accidental withdrawal of the pin. By depressing or squeezing together the head end of the pin, however, the catches will be withdrawn from engagement with the ring and the pin can then be readily removed.

In Fig. 2 I have shown a similar form of ring; but the pin $2^a$ instead of being split at the head end has a slot or recess 5 formed in it for the reception of a spring-catch $4^a$, which has a knob 6, whereby it may be readily manipulated.

The ring shown in Fig. 3 has openings in both sides, and the pin $2^b$ passes completely through the ring, the retaining-catch $4^b$ being adapted to a recess formed in the pin near the pointed end of the same. A similar form of ring is shown in Fig. 4; but in this case the pointed end of the pin $2^c$ is threaded for the reception of a nut 7, which bears upon the outer side of the ring and serves to retain the pin in place.

In the construction shown in Figs. 5 and 7 the pointed and projecting end of the pin $2^d$ has opposite notches or recesses formed in it, which receive spring-jaws $4^d$ on a retainer 8, the latter bearing against the outer face of the ring in order to retain the pin longitudinally in position, the notches in the pin and the spring-jaws being curved, as shown in Fig. 7, so that the jaws can be relieved from engagement with the notches by turning the retainer.

In that form of my invention shown in Fig. 6 I employ instead of a straight piercing-pin a hinged pin $2^e$, which is hung at one end to a head 9, having spring-catches $4^e$ engaging with one side of the ring, the retaining-hook 10 for the pin $2^e$ having a head which is provided with spring-catches $4^f$, engaging with the opposite side of the ring.

The appearance of the ring is not marred by the opening or openings formed therein, nor do these openings interfere in any way with the ordinary use of the ring, and either of the constructions shown and described permits of the ready application or removal of the retaining-pin when desired, but effectually prevents its accidental release or removal when the ring is being used as a pin or brooch.

I am aware that a finger-ring has been provided with a box-like setting for interchangeable ornaments to be held in place by a transverse pin which was capable of being inserted and withdrawn laterally; but this is essentially distinct from my invention, in which the transverse pin is applied to the circlet and is intended for rendering the ring available for other uses than a finger-ring, a result which could not be attained by the patented construction to which I have just alluded.

Having thus described my invention, I claim and desire to secure by Letters Patent—

1. A finger-ring having in its circlet an opening or openings for the reception of a securing-pin or pin attachment, substantially as specified.

2. The combination of a finger-ring having in its circlet an opening or openings, with a securing-pin or attachment adapted to said opening or openings, and provided with means whereby its accidental removal is prevented, substantially as specified.

3. A finger-ring having in its circlet an opening or openings, and a securing-pin or attachment adapted to said opening or openings, and having a spring-catch for preventing its accidental removal, substantially as specified.

4. A finger-ring having in its circlet an opening in one side, and a socket in the other side, substantially as specified.

5. A finger-ring having in its circlet an opening in one side, and a socket in the other side, in combination with a securing-pin passing through said opening and seated in said socket, said pin having a spring-catch for engaging with the ring and preventing accidental removal of the pin therefrom, substantially as specified.

In testimony whereof I have signed my name to this specification in the presence of two subscribing witnesses.

MARY E. HALFMANN.

Witnesses:
F. E. BECHTOLD,
JOS. H. KLEIN.